(12) United States Patent
Lee et al.

(10) Patent No.: US 10,672,209 B2
(45) Date of Patent: Jun. 2, 2020

(54) DOOR LOCK CONTROL APPARATUS AND METHOD

(71) Applicant: Samsung Electronics Co., Ltd., Suwon-si, Gyeonggi-do (KR)

(72) Inventors: Kang-min Lee, Hwaseong-si (KR);
Seung-eok Choi, Suwon-si (KR);
Jae-eun Kang, Suwon-si (KR);
Chang-han Kim, Suwon-si (KR);
Jong-youb Ryu, Suwon-si (KR);
Chang-hyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/065,946

(22) PCT Filed: Jul. 21, 2016

(86) PCT No.: PCT/KR2016/007950
§ 371 (c)(1),
(2) Date: Jun. 25, 2018

(87) PCT Pub. No.: WO2017/115961
PCT Pub. Date: Jul. 6, 2017

(65) Prior Publication Data
US 2019/0012860 A1 Jan. 10, 2019

(30) Foreign Application Priority Data
Dec. 29, 2015 (KR) .................. 10-2015-0188908

(51) Int. Cl.
*G07C 9/00* (2020.01)
*E05B 47/00* (2006.01)
(Continued)

(52) U.S. Cl.
CPC .......... *G07C 9/00309* (2013.01); *E05B 47/00* (2013.01); *G07C 9/00817* (2013.01);
(Continued)

(58) Field of Classification Search
CPC ...... G07C 9/00309; G07C 2009/00317; G07C 2009/00412; G07C 2009/0042;
(Continued)

(56) References Cited

U.S. PATENT DOCUMENTS 3,860,911 A * 1/1975 Hinman ............. G07C 9/00103
340/5.24
RE29,259 E * 6/1977 Sabsay ............... G07C 9/00023
235/382.5
(Continued)

FOREIGN PATENT DOCUMENTS

KR 10-0134000 B1 12/1997
KR 10-0369987 B1 1/2003
(Continued)

*Primary Examiner* — Edwin C Holloway, III
(74) *Attorney, Agent, or Firm* — Jefferson IP Law, LLP

(57) ABSTRACT

Provided are door lock control apparatus and method having enhanced security and being capable of providing improved convenience to a user, the door lock control method including: requesting a server for security information set in a door lock; receiving first security information from the server; unlocking the door lock by using the first security information; and setting second security information different from the first security information, in the door lock.

20 Claims, 17 Drawing Sheets

(51) Int. Cl.
  *H04W 4/00* (2018.01)
  *H04W 4/80* (2018.01)
(52) U.S. Cl.
  CPC ............... *H04W 4/00* (2013.01); *H04W 4/80* (2018.02); *E05B 2047/0095* (2013.01); *G07C 9/00571* (2013.01); *G07C 2009/00317* (2013.01); *G07C 2009/00341* (2013.01); *G07C 2009/00357* (2013.01); *G07C 2009/00507* (2013.01); *G07C 2009/00841* (2013.01)
(58) Field of Classification Search
  CPC .... G07C 2009/00492; G07C 2009/005; G07C 9/00817; G07C 9/00857; G07C 2009/00865; G07C 2009/0088; G07C 9/00904; G07C 2009/00468; G07C 9/00571; G07C 2009/00341; G07C 2009/00357; G07C 2009/00507; H04W 4/80; H04W 4/00; E05B 47/00; E05B 2047/0095
  USPC ................................. 340/5.61, 5.23
  See application file for complete search history.

(56) References Cited

U.S. PATENT DOCUMENTS

| | | | | |
|---|---|---|---|---|
| 4,207,555 A | * | 6/1980 | Trombly | G07C 9/00182 235/382.5 |
| 4,396,914 A | * | 8/1983 | Aston | E05B 49/006 235/382 |
| 4,870,400 A | * | 9/1989 | Downs | E05B 49/006 340/5.24 |
| 4,972,182 A | * | 11/1990 | Novik | G07C 9/00182 340/5.25 |
| 6,600,221 B2 | | 7/2003 | Kimura | |
| 8,331,544 B2 | | 12/2012 | Kraus et al. | |
| 8,814,046 B1 | | 8/2014 | Wallner | |
| 8,943,187 B1 | * | 1/2015 | Saylor | G06F 21/6209 709/223 |
| 9,022,285 B2 | | 5/2015 | Graylin | |
| 2002/0178385 A1 | * | 11/2002 | Dent | G07C 9/00309 726/27 |
| 2002/0180582 A1 | * | 12/2002 | Nielsen | G07C 9/00103 340/5.6 |
| 2006/0170533 A1 | * | 8/2006 | Chioiu | G07C 9/00103 340/5.61 |
| 2008/0162676 A1 | * | 7/2008 | Magnusson | G07C 9/00103 709/222 |
| 2011/0140841 A1 | * | 6/2011 | Bona | G06K 19/06187 340/5.83 |
| 2011/0311052 A1 | * | 12/2011 | Myers | G07C 9/00103 380/270 |
| 2014/0049365 A1 | * | 2/2014 | Ahearn | G07C 9/00309 340/5.51 |
| 2014/0283018 A1 | | 9/2014 | Dadu et al. | |
| 2014/0375422 A1 | * | 12/2014 | Huber | G07C 9/00174 340/5.61 |
| 2015/0371469 A1 | * | 12/2015 | Scalisi | E05B 47/026 340/5.52 |

FOREIGN PATENT DOCUMENTS

| | | |
|---|---|---|
| KR | 10-0426825 B1 | 3/2004 |
| KR | 10-2004-0093319 A | 11/2004 |
| KR | 10-2005-0104907 A | 11/2005 |
| KR | 10-2006-0085017 A | 7/2006 |
| KR | 10-0692396 B1 | 3/2007 |
| KR | 10-0794126 B1 | 1/2008 |
| KR | 10-2010-0104156 A | 9/2010 |
| KR | 10-1051552 B1 | 7/2011 |
| KR | 10-2014-0055052 A | 5/2014 |

\* cited by examiner

DOOR LOCK CONTROL APPARATUS AND METHOD

TECHNICAL FIELD

The present disclosure relates to a door lock control apparatus and method having enhanced security and being capable of providing improved convenience to a user.

BACKGROUND ART

Conventional door locks operate according to mechanical locking mechanisms using keys and locks. Recently supplied digital door locks are electronically controlled via an electronic circuit included in door locks. In particular, the digital door locks are mostly used for doors of hotel rooms.

Door locks used in hotels may be released by using magnetic cards. Hotel managers may record information on the magnetic cards to be provided to customers, by using magnetic card writers. The information recorded on the magnetic cards may include room numbers and lengths of stay of the customers in the rooms.

The customers may insert the magnetic cards into the door locks of the rooms. The door locks may read the recorded information from the magnetic cards. The door locks may compare the read information with information set in the door locks. The information set in the door locks may include the room numbers corresponding to the door locks and a current time.

The door locks may determine whether the room numbers included in the read information and the room numbers included in the information set in the door locks match each other. The door locks may determine whether the current time is within the lengths of stay included in the read information. The door locks may be unlocked based on results of the determination.

However, since the magnetic cards are easily duplicated, such door locks may have weak security. Also, such door locks generally do not have remote communication functions. Accordingly, it may be difficult for servers to separately manage histories of locking/unlocking the door locks.

Recently, door locks having remote communication functions have been introduced, but are not widely used due to problems of cost. Accordingly, the door locks that are unlocked by using the magnetic cards are still widely used.

Also, with the development of communication technology and miniaturization of electronic devices, personal terminals are widely used by general consumers. In particular, recently, personal portable terminals, such as smart phones or smart tablet personal computers (PCs), have become widespread. The smart phones include communication modules, and applications using the communication modules are being developed.

DESCRIPTION OF EMBODIMENTS

Technical Problem

Provided are a door lock control apparatus and method having enhanced security.

Also, provided are a door lock control apparatus and method capable of providing improved convenience to a user.

Solution to Problem

According to an aspect of the present disclosure, a door lock control method using a terminal, the method includes: requesting a server for security information set in a door lock; receiving first security information from the server; unlocking the door lock by using the first security information; and setting second security information different from the first security information, in the door lock.

According to another aspect of the present disclosure, a door lock control apparatus includes: a communication unit configured to request a server for security information set in a door lock, and receive first security information from the server in response to the request; and a controller configured to unlock the door lock by using the first security information, and set second security information different from the first security information, in the door lock.

According to another aspect of the present disclosure, a door lock control method of controlling a door lock of a room is provided, the door lock control method includes: requesting, by a first terminal, a server for security information set in the door lock; receiving, by the first terminal, first security information from the server; unlocking, by the first terminal, the door lock by using the first security information; and setting, by the first terminal, second security information in the door lock.

Advantageous Effects of Disclosure

According to embodiments, security of a door lock can be enhanced.

Also, according to embodiments, improved convenience can be provided to a user of a door lock.

MODE OF DISCLOSURE

Advantages and features of one or more embodiments of the present disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the present disclosure will only be defined by the appended claims.

While such terms as "first", "second", etc., may be used to describe various components, such components must not be limited to the above terms. The above terms are used only to distinguish one component from another. Accordingly, a first component may be a second component within the technical ideas of the present disclosure.

The terms used in the present specification are merely used to describe particular embodiments, and are not intended to limit the present disclosure. An expression used in the singular encompasses the expression in the plural, unless it has a clearly different meaning in the context. In the present specification, it is to be understood that terms such as "comprises" or "comprising" are not intended to preclude the possibility that one or more other features, numbers, steps, actions, components, parts, or combinations thereof may exist or may be added.

Unless otherwise defined, all terms used herein have the same meanings as commonly understood by one of ordinary skill in the art to which this disclosure belongs. It will be further understood that terms such as those defined in commonly used dictionaries should be interpreted as having meanings that are consistent with their meanings in the context of the relevant art and will not be interpreted in an idealized or overly formal sense unless expressly so defined herein.

Hereinafter, a door lock control apparatus 100 controlling a door lock 300, according to one or more embodiments, will be described with reference to FIGS. 1 through 17.

The door lock 300 may be provided at a door. For example, the door lock 300 may be provided at a door of a room. As another example, the door lock 300 may be provided at a door of a personal locker in a gym, a swimming pool, a public path, or a locker room. However, an embodiment is not limited thereto, and the door lock 300 may be provided at any door.

Figure 1:
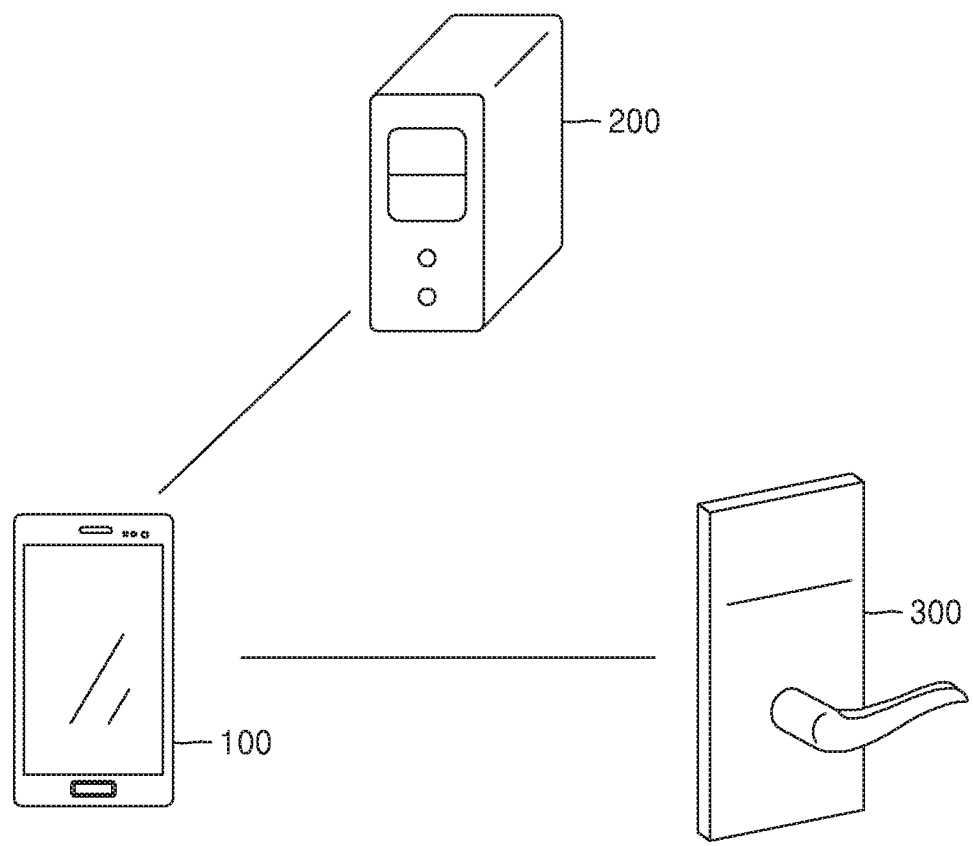
FIG. 1 is a network configuration diagram showing an environment in which a door lock control apparatus operates, according to an embodiment.

FIG. 1 is a network configuration diagram showing an environment in which the door lock control apparatus 100 operates, according to an embodiment. Referring to FIG. 1, the environment in which the door lock control apparatus 100 operates may include the door lock control apparatus 100, a server 200, and the door lock 300.

The door lock control apparatus 100 may be a terminal. The door lock control apparatus 100 may be, for example, a laptop computer, a smart phone, a smart tablet computer, a smart watch, a mobile terminal, a digital camera, a wearable device, or a portable electronic device. The door lock control apparatus 100 may execute a program or an application. The door lock control apparatus 100 may be connected to the server 200 through a communication network. The door lock control apparatus 100 may transmit or receive data to or from the server 200 through the communication network.

The communication network may be embodied by using a wired communication network, a wireless communication network, or a complex communication network. The communication network may include a mobile communication network, such as 3rd generation (3G), long-term evolution (LTE), or LTE-A. The communication network may include a wired or wireless communication network, such as Wi-Fi, universal mobile telephone system (UMTS)/general packet radio service (GPRS), or Ethernet. The communication network may include a short-distance communication network, such as magnetic secure transmission (MST), radio frequency identification (RFID), near field communication (NFC), ZigBee, Z-wave, Bluetooth, Bluetooth low energy (BLE), or infrared (IR) communication. The communication network may include a local area network (LAN), a metropolitan area network (MAN), or a wide area network (WAN).

The door lock control apparatus 100 may control the door lock 300. The door lock control apparatus 100 may transmit or receive data to or from the door lock 300 via the short-distance communication. The door lock control apparatus 100 may detect a signal output from the door lock 300.

The server 200 may be connected to the door lock control apparatus 100 through a communication network. The server 200 may process data received from the door lock control apparatus 100. The server 200 may store the processed data in the server 200 or in an external database (DB). The server 20 may load the stored data in a memory to prepare transmission of the stored data. The server 200 may transmit the processed data or the loaded data to the door lock control apparatus 100.

The door lock 300 may receive data from the door lock control apparatus 100 via the short-distance communication. The door lock 300 may process the received data. For example, the door lock 300 may compare data set in the door lock 300 and the received data. The door lock 300 may pre-store the set data in the door lock 300 for comparison. The set data may be fixed data that is not changeable, or may be data refinable or changeable by the door lock 300 or an external apparatus. The door lock 300 may unlock the door lock 300 according to a result of the comparing. After unlocking the door lock 300, the door lock 300 may output a signal indicating that the door lock 300 is unlocked.

Figure 2:
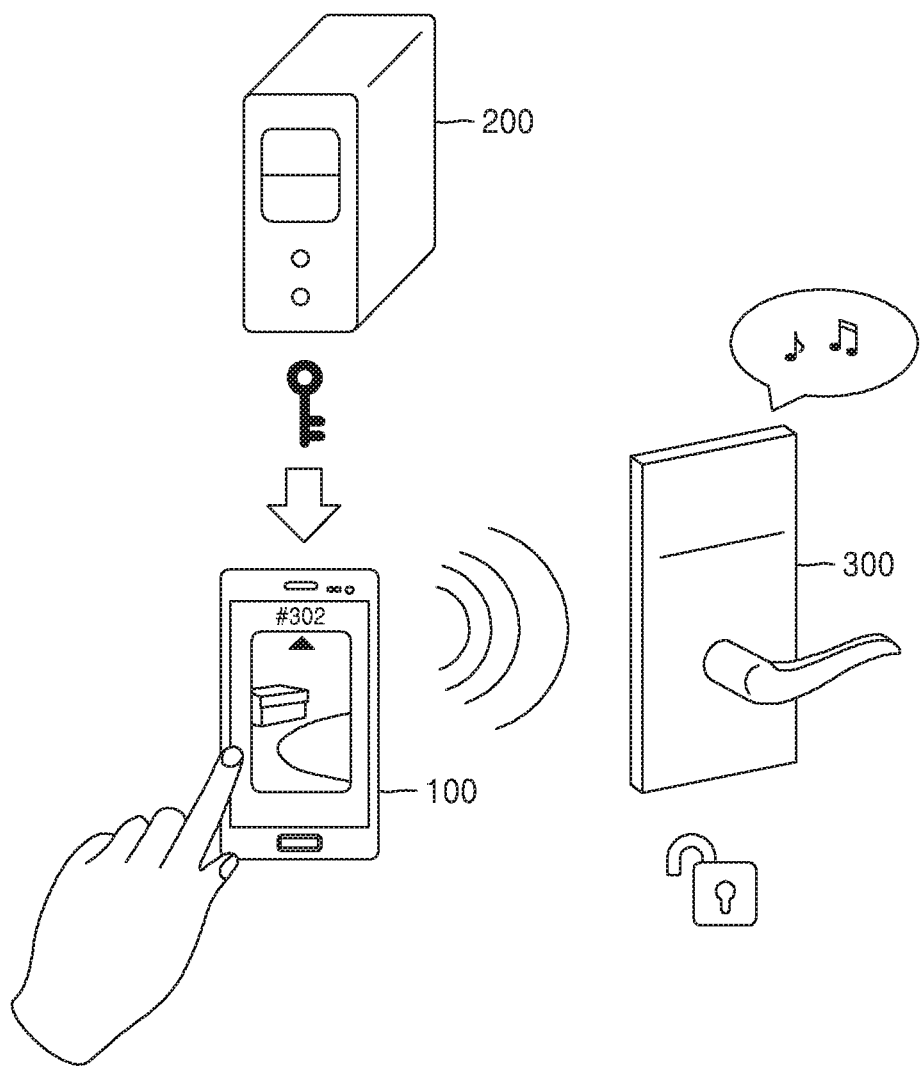
FIG. 2 is a conceptual diagram of operations of a door lock control apparatus, according to an embodiment.

FIG. 2 is a conceptual diagram of operations of the door lock control apparatus 100, according to an embodiment. Referring to FIG. 2, a user of the door lock control apparatus 100 for unlocking the door lock 300 may input a certain input to the door lock control apparatus 100. For example, the user may input a touch input to a touch screen of the door lock control apparatus 100. In response to the touch input, the door lock control apparatus 100 may execute an application.

While executing the application, the door lock control apparatus 100 may request the server 200 for security information for unlocking the door lock 300. The door lock control apparatus 100 may receive the security information from the server 200, in response to the request. The received security information may include a code used to unlock the door lock 300. The code may include at least one word. The word may include a bit string, a numeric, a character, a symbol, or a string.

The door lock control apparatus 100 may transmit the received security information to the door lock 300 via the short-distance communication. For example, the door lock control apparatus 100 may transmit the security information to the door lock 300 by outputting a magnetic field corresponding to the security information. In other words, the door lock control apparatus 100 may transmit the security information to the door lock 300 via magnetic secure transmission (MST).

The door lock 300 may receive the security information by detecting the magnetic field output from the door lock control apparatus 100. The door lock 300 may compare the received security information and security information set in the door lock 300. The security information set in the door lock 300 may include a code. The door lock 300 may determine whether the code included in the received security information and the code included in the security information set in the door lock 300 match each other. The door lock 300 may unlock the door lock 300 based on a result of the determination.

After unlocking the door lock 300, the door lock 300 may output a signal indicating that the door lock 300 is unlocked. For example, the door lock 300 may reproduce unlocking sound.

Detailed operations of the door lock control apparatus 100, the server 200, and the door lock 300, within the door lock control method according to one or more embodiments will be described later with reference to FIGS. 4 through 17.

Figure 3:
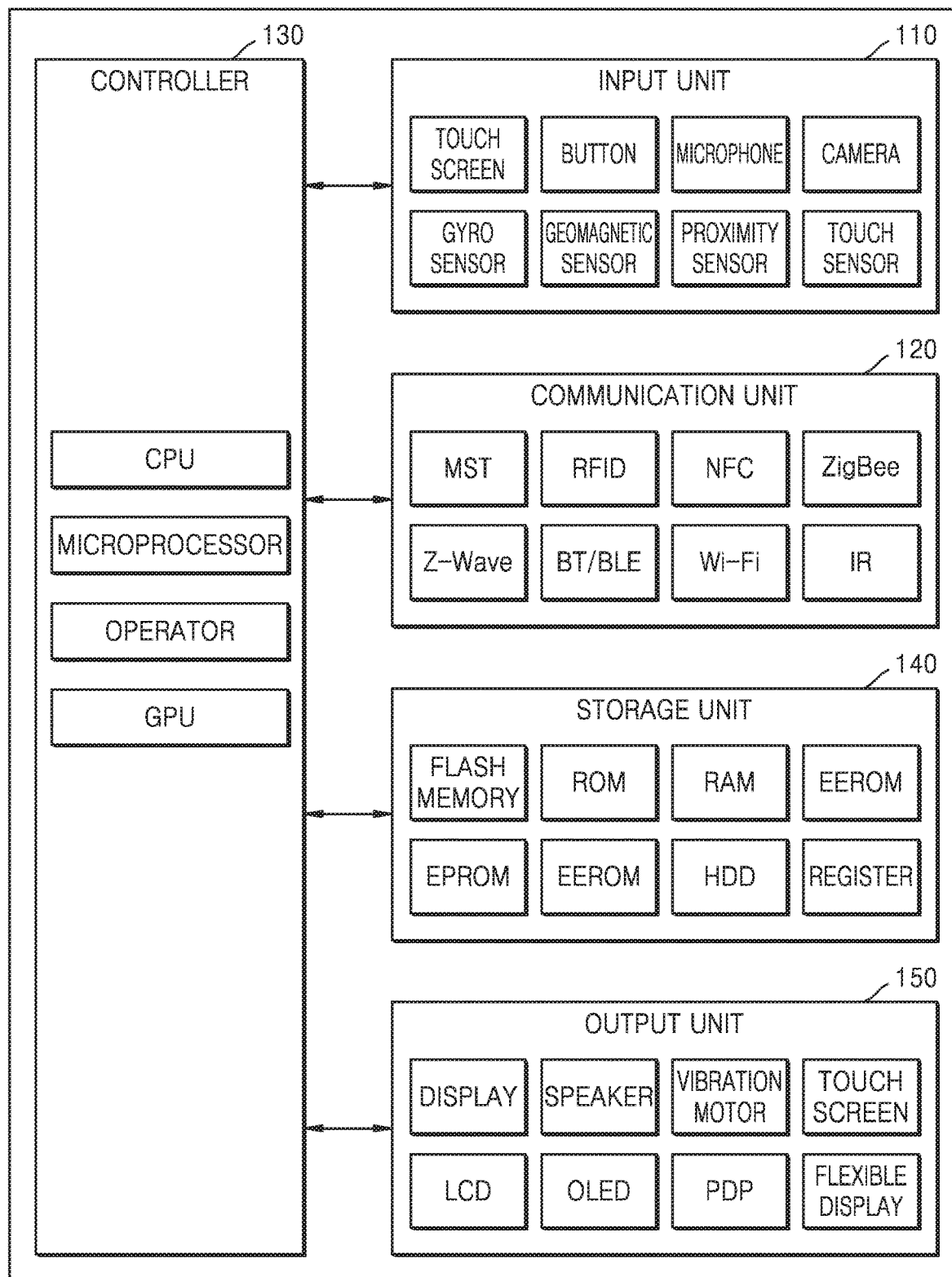
FIG. 3 is a block diagram of a configuration of a door lock control apparatus, according to an embodiment.

FIG. 3 is a block diagram of a configuration of the door lock control apparatus 100, according to an embodiment. Referring to FIG. 3, the door lock control apparatus 100 may include an input unit 110, a communication unit 120, a controller 130, a storage unit 140, and an output unit 150.

The input unit 110 may receive an external input. The input unit 110 may receive an input from a user of the door lock control apparatus 100. The input unit 110 may be, for example, a touch screen, a button, a microphone, a camera, a gyro sensor, a geomagnetic sensor, an acceleration sensor, an ultrasonic sensor, a proximity sensor, a touch sensor, a track ball, a keyboard, a mouse, a fingerprint recognition device, or the like. The input unit 110 and the output unit 150 may be embodied in integrated hardware, such as a touch screen, or in separate hardware.

The input unit 110 may be a touch screen. The input unit 110 may receive a touch input from the user. The user may input, as the touch input, a tap input, a drag input, a swipe input, a slide input, a flick input, a press-and-hold input, or the like.

When the input unit 110 receives an external input, the controller 130 may execute a corresponding application. For example, when a touch input on a touch screen of the input unit 110 is received, the controller 130 may execute a door lock control application. As another example, when a touch input on a fingerprint recognition device of the input unit 110 is received, the controller 130 may execute the door lock control application. As another example, when a voice input is received through a microphone of the input unit 110, the controller 130 may execute the door lock control application.

As another example, when it is detected that the door lock control apparatus 100 approached the door lock 300 via Bluetooth communication, the controller 130 may execute the door lock control application. As another example, when it is detected that the door lock control apparatus 100 approached a particular location while tracking a location of the door lock control apparatus 100, the controller 130 may execute the door lock control application. As another example, when the user inputs a particular gesture input, such as shaking, to the door lock control apparatus 100, the controller 130 may execute the door lock control application.

The controller 130 may perform user authentication before executing the door lock control application. The controller 130 may perform user authentication by using biometric information of the user. For example, the controller 130 may recognize and authenticate the user by using an input fingerprint or input voice. When the user authentication succeeds, the controller 130 may execute the door lock control application.

The communication unit 120 may transmit or receive data to or from an external source. The communication unit 120 may transmit or receive data to or from the server 200 while the door lock control application is executed.

The communication unit 120 may include, for example, a remote network interface, such as a 3G module, an LTE module, an LTE-A module, a Wi-Fi module, a WiGig module, an ultra wide band (UWB) module, or a LAN card. Also, the communication unit 120 may include a short-distance network interface, such as an MST module, a Bluetooth module, an NFC module, an RFID module, a ZigBee module, a Z-wave module, or an infrared module. Also, the communication unit 120 may include another network interface.

The controller 130 may control each of components included in the door lock control apparatus 100, and operations of the door lock control apparatus 100. Also, the controller 130 may perform calculations. The controller 130 may control operations of the door lock control apparatus 100, in response to an input from the user.

The controller 130 may execute an application. The controller 130 may execute the door lock control application. The controller 130 may control the input unit 110, the communication unit 120, the storage unit 140, and the output unit 150 while executing the door lock control application.

The controller 130 may control the door lock 300 by using data received from the server 200. The controller 130 may unlock the door lock 300 by using the data received from the server 200. The controller 130 may set security information in the door lock 300, wherein the security information is to be used to unlock the door lock 300 the next time. The controller 130 may store the security information in the door lock 300, wherein the security information is to be used to unlock the door lock 300 the next time. The controller 130 may transmit the security information in the door lock 300, wherein the security information is to be used to unlock the door lock 300 the next time.

The controller 130 may be connected to each of the component included in the door lock control apparatus 100. The controller 130 may be, for example, a central processing unit (CPU) or a microprocessor. The controller 130 may include an operator or a graphics processing unit (GPU).

The storage unit 140 may store data. The storage unit 140 may store data to be transmitted to or received from an external source. The storage unit 140 may store data to be transmitted to the server 200. The storage unit 140 may store data to be received from the server 200. The storage unit 140 may store data to be transmitted to the door lock 300. Also, the storage unit 140 may store data to be displayed on the output unit 150.

The storage unit 140 may store information about the door lock control apparatus 100. For example, the storage unit 140 may store identification (ID) information of the door lock control apparatus 100. Also, the storage unit 140 may store information about the user of the door lock control apparatus 100. For example, the storage unit 140 may store ID information of the user, personal information of the user, or preference information of the user.

Also, the storage unit 140 may further store information about whether to allow external transmission of the stored information about the user. For example, the storage unit 140 may store, as the personal information of the user, schedule information and contact information of the user. This may be acceptable even when the schedule information is open to the public. However, when the contact information is open to the public, a security issue may arise. The storage unit 140 may store information indicating that the schedule information is allowed to be externally transmitted, and information indicating that the contact information is not allowed to be externally transmitted.

The storage unit 140 may be a volatile or non-volatile memory. The storage unit 140 may be, for example, a flash memory, a read-only memory (ROM), a random access memory (RAM), an electrically erasable ROM (EEROM), an erasable and programmable ROM (EPROM), an electrically erasable and programmable ROM (EEPROM), a hard disk drive (HDD), or a register. The storage unit 140 may include, for example, a file system, a DB, or an embedded DB.

The output unit 150 may output data. The output unit 150 may output data stored in the storage unit 140. The output unit 150 may output data received from the server 200.

The output unit 150 may include, for example, a display, a speaker, a vibration motor, or another output device. The output unit 150 may be a touch screen. The output unit 150 may display a screen. The output unit 150 may display a user interface. Also, the output unit 150 may display another screen in response to an input of the user.

The output unit 150 may be a flat panel display apparatus, such as a liquid crystal display (LCD), an organic light-emitting diode (OLED), or a plasma display panel (PDP). The output unit 150 may be a curved display or a flexible display. The input unit 110 and the output unit 150 may be embodied in integrated hardware, such as a touch screen, or in separate hardware.

Figure 4:
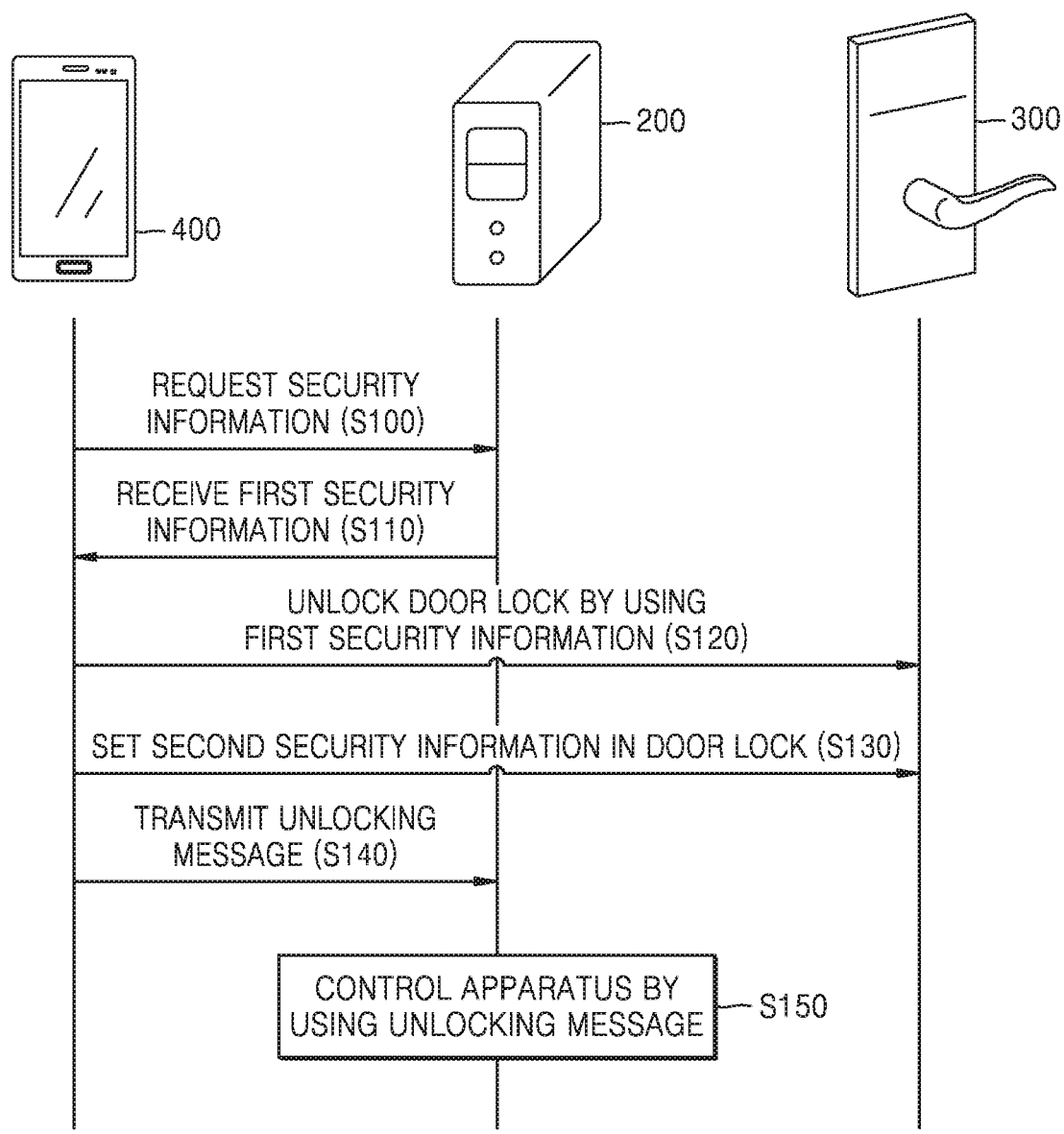
FIG. 4 is a data flow diagram showing processes of performing a door lock control method, according to an embodiment.

FIG. 4 is a data flow diagram showing processes of performing a door lock control method, according to an embodiment. When the user who is to unlock the door lock 300 of a room inputs a particular input to the input unit 110 of the door lock control apparatus 100, the controller 130 of the door lock control apparatus 100 may execute the door lock control application. Following processes may be performed while the door lock control application is executed. Hereinafter, the door lock control apparatus 100 may be referred to as a first terminal 400 or a second terminal 500.

Referring to FIG. 4, according to the door lock control method of an embodiment, first, the first terminal 400 may request the server 200 for security information corresponding to the door lock 300, in operation S100. The first terminal 400 may be the door lock control apparatus 100. The first terminal 400 may request the server 200 for the security information for unlocking the door lock 300, through the communication unit 120 of the first terminal 400.

The first terminal 400 may request the server 200 for the security information by transmitting a request message to the server 200. The request message may include at least one of ID information of a room, ID information of the first terminal 400, and ID information of the user of the first terminal 400. The server 200 may receive the request message from the first terminal 400.

Figure 5:
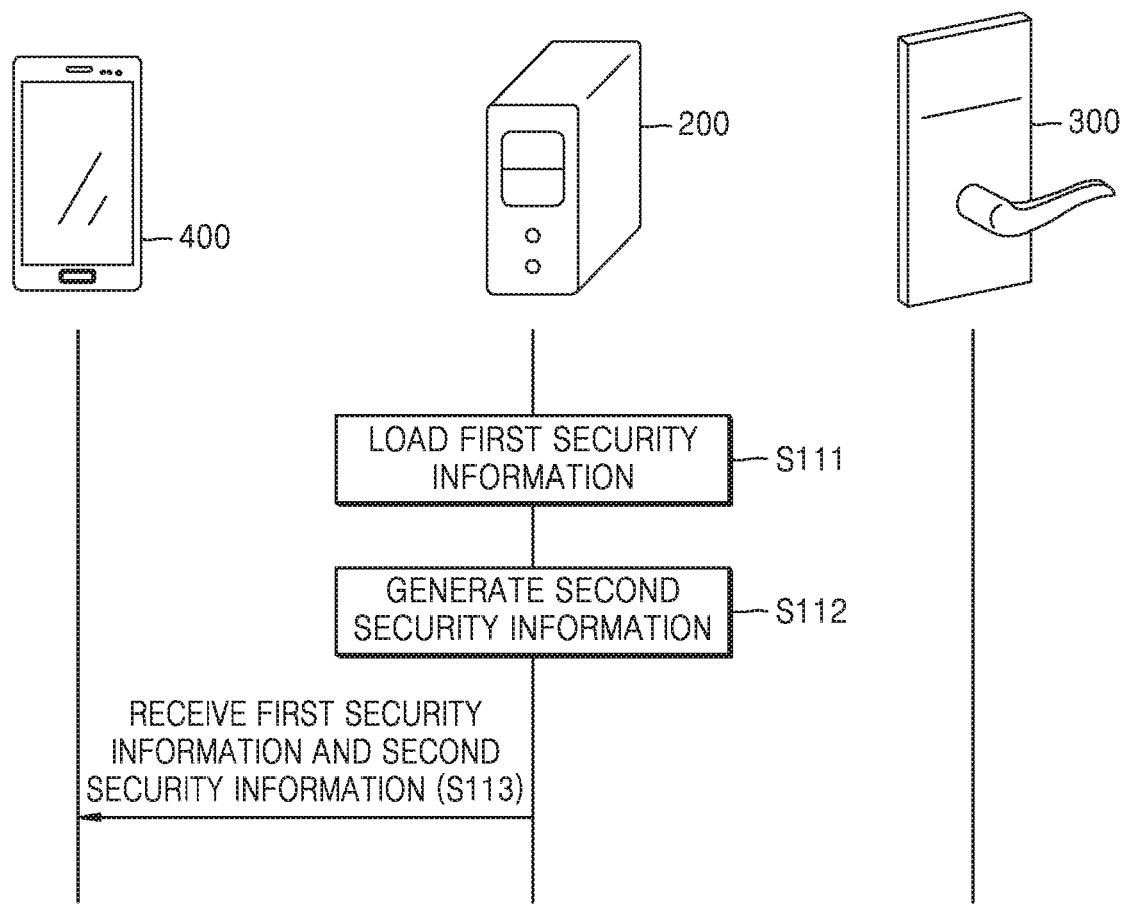
FIG. 5 is a data flow diagram showing processes of receiving first security information, according to an embodiment.

Then, the first terminal 400 may receive first security information from the server 200, in operation S110. The first security information may be the security used to unlock the door lock 300. The first security information may include a code used to unlock the door lock 300. FIG. 5 is a data flow diagram showing processes of receiving the first security information in operation S110, according to an embodiment.

Referring to FIG. 5, first, the server 200 may load the first security information, in operation S111. The server 200 may load the first security information by using the request message received from the first terminal 400. The server 200 may search for the first security information in a DB, by using the ID information of the room, the ID information of the first terminal 400, or the ID information of the user of the first terminal 400, which is included in the request message.

The DB may include at least one record. Each record may include at least one field. Each record may include at least one of the ID information of the first terminal 400, the ID information of the room, the first security information, information about a time when the first security information is generated, the ID information of the user, the personal information of the user, and the preference information of the user. The server 200 may detect a corresponding record by searching the DB by using ID information included in the request message. ID information included in the detected record may match the ID information included in the request message. The server 200 may load the first security information included in the detected record.

Then, the server 200 may generate second security information in operation S112. The second security information may be security information used to unlock the door lock 300 the next time. The second security information may be security information used to unlock the door lock 300 the next time after the door lock 300 is unlocked by using the first security information. The second security information may include a code. The server 200 may generate the second security information by using a random algorithm. The server 200 may store the generated second security information. The server 200 may replace the first security information included in the detected record with the generated second security information. Also, the server 200 may replace the information about the time when the first security information is generated, included in the detected record with information about a time when the second security is generated.

Then, the first terminal 400 may receive the first security information and the second security information from the server 200, in operation S113. The server 200 may transmit the loaded first security information and the generated second security information to the first terminal 400. The first terminal 400 may receive the first security information and the second security information from the server 200. The first terminal 400 may store the received first security information and second security information in the storage unit 140.

According to another embodiment, operation S112 may be omitted. The server 200 may transmit only the loaded first security information to the first terminal 400. The first terminal 400 may receive only the first security information from the server 200.

Figure 6:
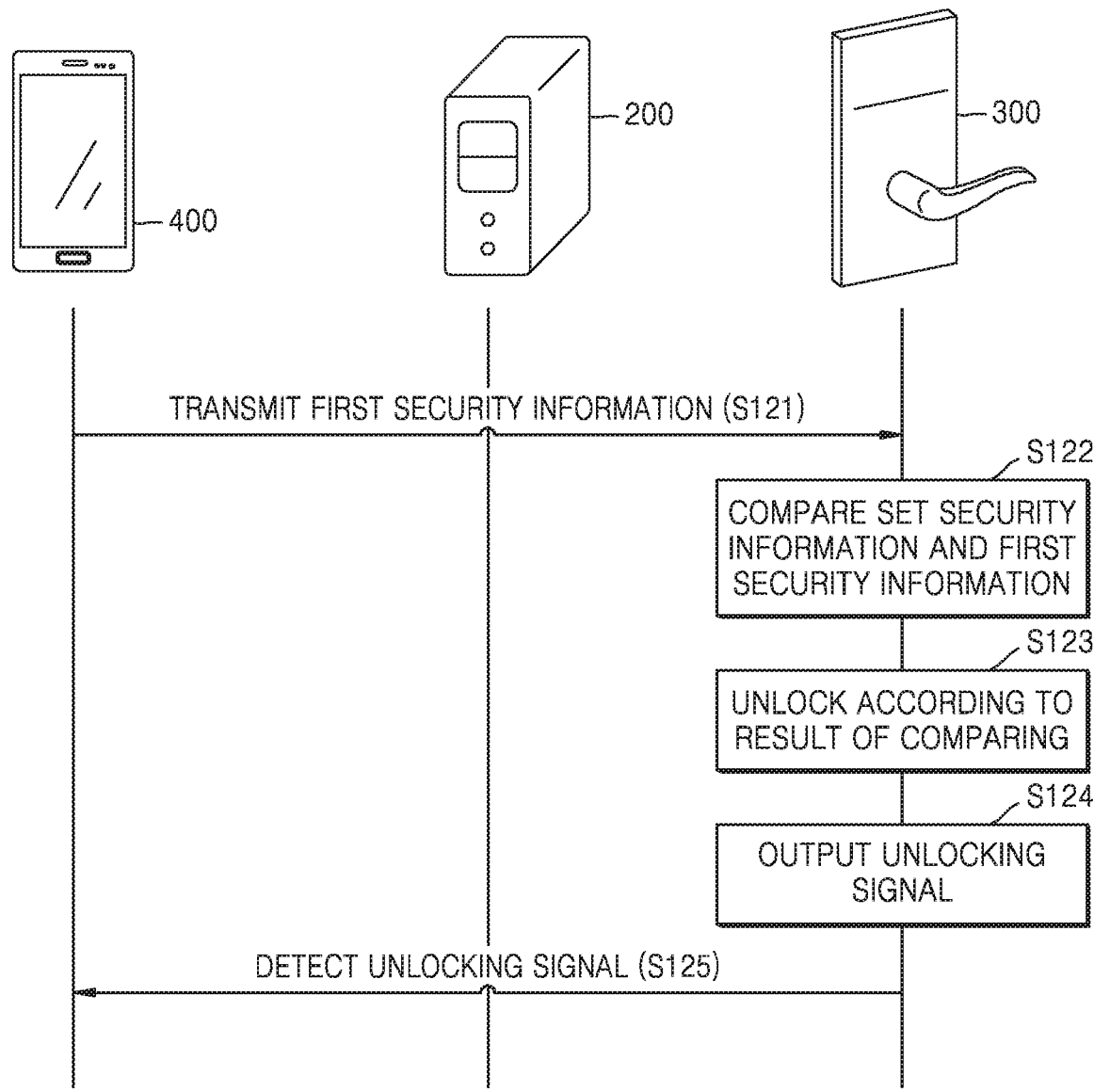
FIG. 6 is a data flow diagram showing processes of unlocking a door lock, according to an embodiment.

Referring back to FIG. 4, the first terminal 400 may unlock the door lock 300 by using the first security information, in operation S120. The controller 130 of the first terminal 400 may unlock the door lock 300 by using the first security information. FIG. 6 is a data flow diagram showing processes of unlocking the door lock in operation S120, according to an embodiment.

Referring to FIG. 6, first, the first terminal 400 may transmit the first security information to the door lock 300 via the short-distance communication, in operation S121. The communication unit 120 of the first terminal 400 may transmit the first security information to the door lock 300 via the short-distance communication. For example, the communication unit 120 may transmit the first security information to the door lock 300 via MST. In other words, the communication unit 120 may output a magnetic field corresponding to the first security information. The door lock 300 may receive the first security information. The door lock 300 may detect the magnetic field output by the first terminal 400.

Then, the door lock 300 may compare the first security information and the security information set in the door lock 300, in operation S122. The door lock 300 may compare the security information set in the door lock 300 and the received first security information. The door lock 300 may determine whether a code included in the security information set in the door lock 300 matches the code included in the first security information.

Then, the door lock 300 may unlock the door lock 300 by using a result of the comparing, in operation S123. When the code included in the security information set in the door lock 300 matches the code included in the first security information, the door lock 300 may be unlocked. When the code included in the security information set in the door lock 300 is different from the code included in the first security information, the door lock 300 may not be unlocked.

Then, the door lock 300 may output an unlocking signal in operation S124. After the door lock 300 is unlocked, the door lock 300 may output a signal indicating that the door lock 300 is unlocked. For example, the door lock 300 may reproduce unlocking sound.

Then, the first terminal 400 may detect the unlocking signal in operation S125. For example, the first terminal 400 may detect the unlocking signal through a microphone of the input unit 110.

Figure 7:
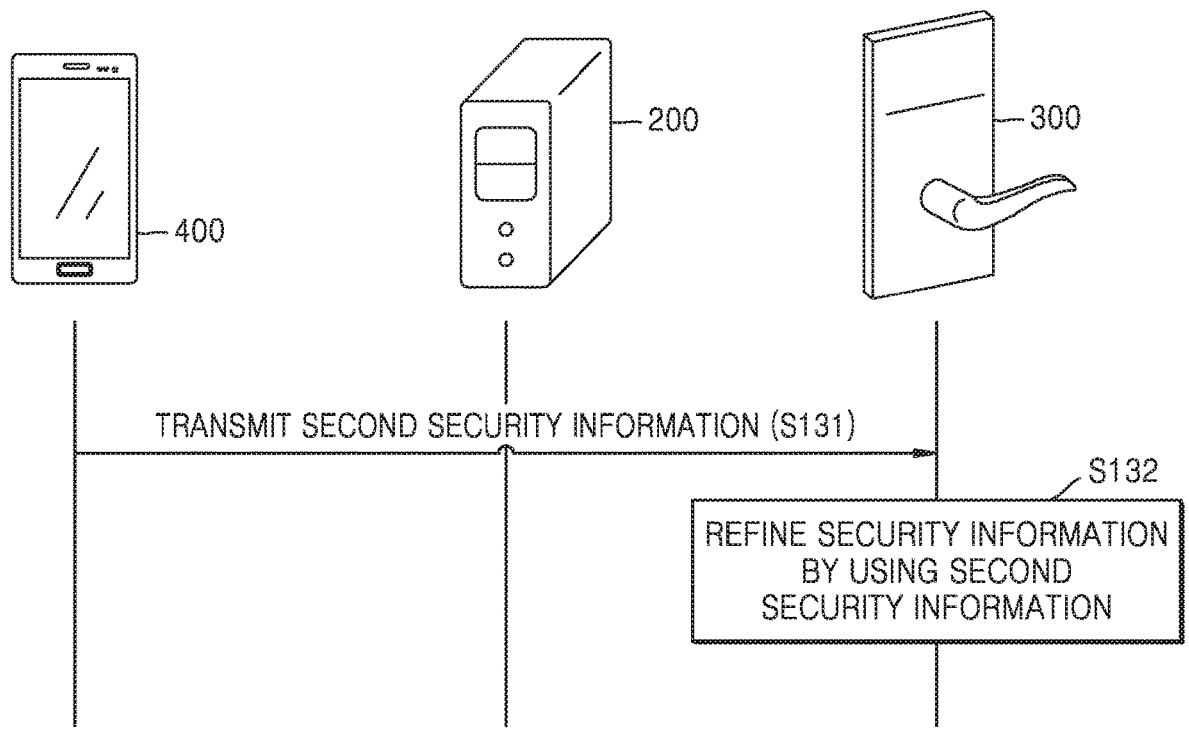
FIG. 7 is a data flow diagram showing processes of setting second security information in a door lock, according to an embodiment.

Referring back to FIG. 4, the first terminal 400 may set the second security information in the door lock 300, in operation S130. The controller 130 of the first terminal 400 may set the second security information in the door lock 300. FIG. 7 is a data flow diagram showing processes of setting the second security information in the door lock 300, in operation S130, according to an embodiment.

Referring to FIG. 7, first, the first terminal 400 may transmit the second security information to the door lock 300 via the short-distance communication, in operation S131. The controller 130 of the first terminal 400 may load the second security information received from the server 200 and stored in the storage unit 140. The communication unit 120 of the first terminal 400 may transmit the loaded second security information to the door lock 300. For example, the communication unit 120 may transmit the second security information to the door lock 300 via MST. The communication unit 120 may output a magnetic field corresponding to the second security information. The door lock 300 may receive the second security information. The door lock 300 may detect the magnetic field output by the first terminal 400.

Then, the door lock 300 may refine security information set in the door lock 300 by using the second security information, in operation S132. The door lock 300 may replace the security information set in the door lock 300 with the received second security information. Accordingly, the second security information may be used to unlock the door lock 300 the next time. Accordingly, according to an embodiment, the door lock control method having enhanced security may be provided because the security information set in the door lock 300 is refined whenever the door lock 300 is unlocked.

Figure 8:
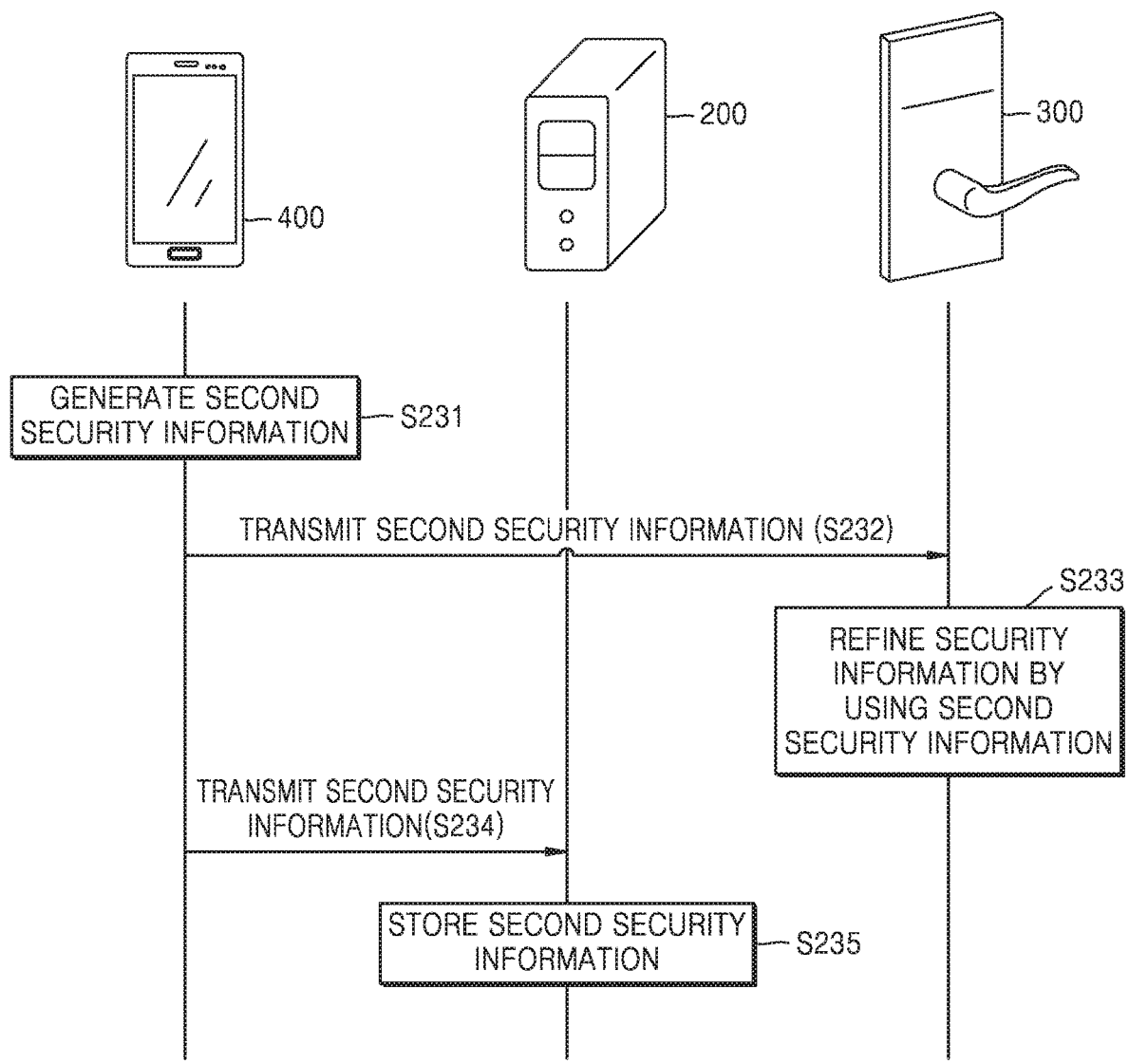
FIG. 8 is a data flow diagram showing processes of setting second security information in a door lock, according to another embodiment.

When operation S112 is omitted according to another embodiment, the second security information may be generated by the first terminal 400. In other words, when only the first security information is received from the server 200, the first terminal 400 may generate the second security information as follows. FIG. 8 is a data flow diagram showing processes of setting the second security information in the door lock 300, in operation S130, according to another embodiment.

Referring to FIG. 8, first, the first terminal 400 may generate the second security information in operation S231. The second security information may be security information used to unlock the door lock 300 the next time. The second security information may include a code. The first terminal 400 may generate the second security information by using a random algorithm. The first terminal 400 may store the generated second security information in the storage unit 140.

Then, the first terminal 400 may transmit the second security information to the door lock 300 via the short-distance communication, in operation S232. The communication unit 120 of the first terminal 400 may transmit the generated second security information to the door lock 300. For example, the communication unit 120 may transmit the second security information to the door lock 300 via MST. In other words, the communication unit 120 may output a magnetic field corresponding to the second security information. The door lock 300 may receive the second security information. The door lock 30 may detect the magnetic field output by the first terminal 400.

Then, the door lock 300 may refine the security information set in the door lock 300 by using the second security information, in operation S233. The door lock 300 may replace the security information set in the door lock 300 with the received second security information. Accordingly, the second security information may be used to unlock the door lock 300 the next time.

Figure 9:
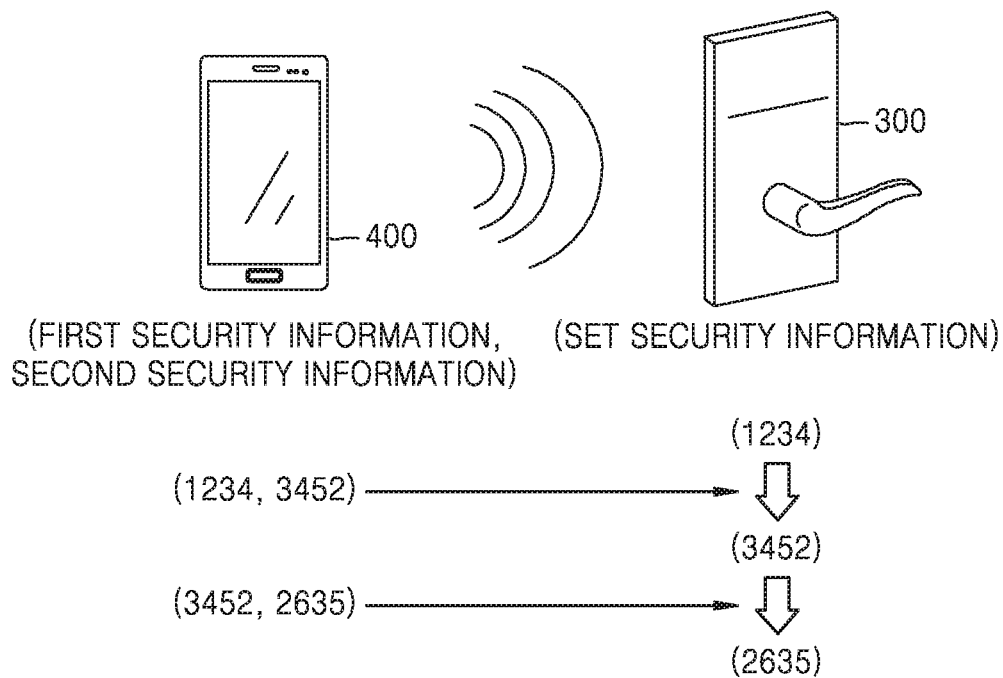
FIG. 9 is a reference diagram for describing the setting of the second security information in the door lock, according to the other embodiment.

FIG. 9 is a reference diagram for describing the setting of the second security information in the door lock 300, in operation S130, according to the other embodiment. Referring to FIG. 9, a code included in security information currently set in the door lock 300 may be '1234'. The first terminal 400 may transmit first security information including '1234' to the door lock 300 to unlock the door lock 300. Also, the first terminal 400 may transmit second security information including '3452' to the door lock 300 to refine the security information set in the door lock 300. At the next time, the first terminal 400 may transmit first security information including '3452' to the door lock 300 to unlock the door lock 300. Also, the first terminal 400 may transmit second security information including '2635' to the door lock 300 to refine the security information set in the door lock 300.

Referring back to FIG. 8, the first terminal 400 may transmit the second security information to the server 200, in operation S234. The communication unit 120 of the first terminal 400 may transmit the second security information to the server 200. The server 200 may receive the second security information.

Then, the server 200 may store the second security information in operation S235. The server 200 may store the received second security information. While loading the first security information in operation S111, the server 200 may replace the first security information included in the record detected by using the request message with the received second security information. Also, the server 200 may replace the information about the time included in the detected record with information about the current time.

Figure 10:
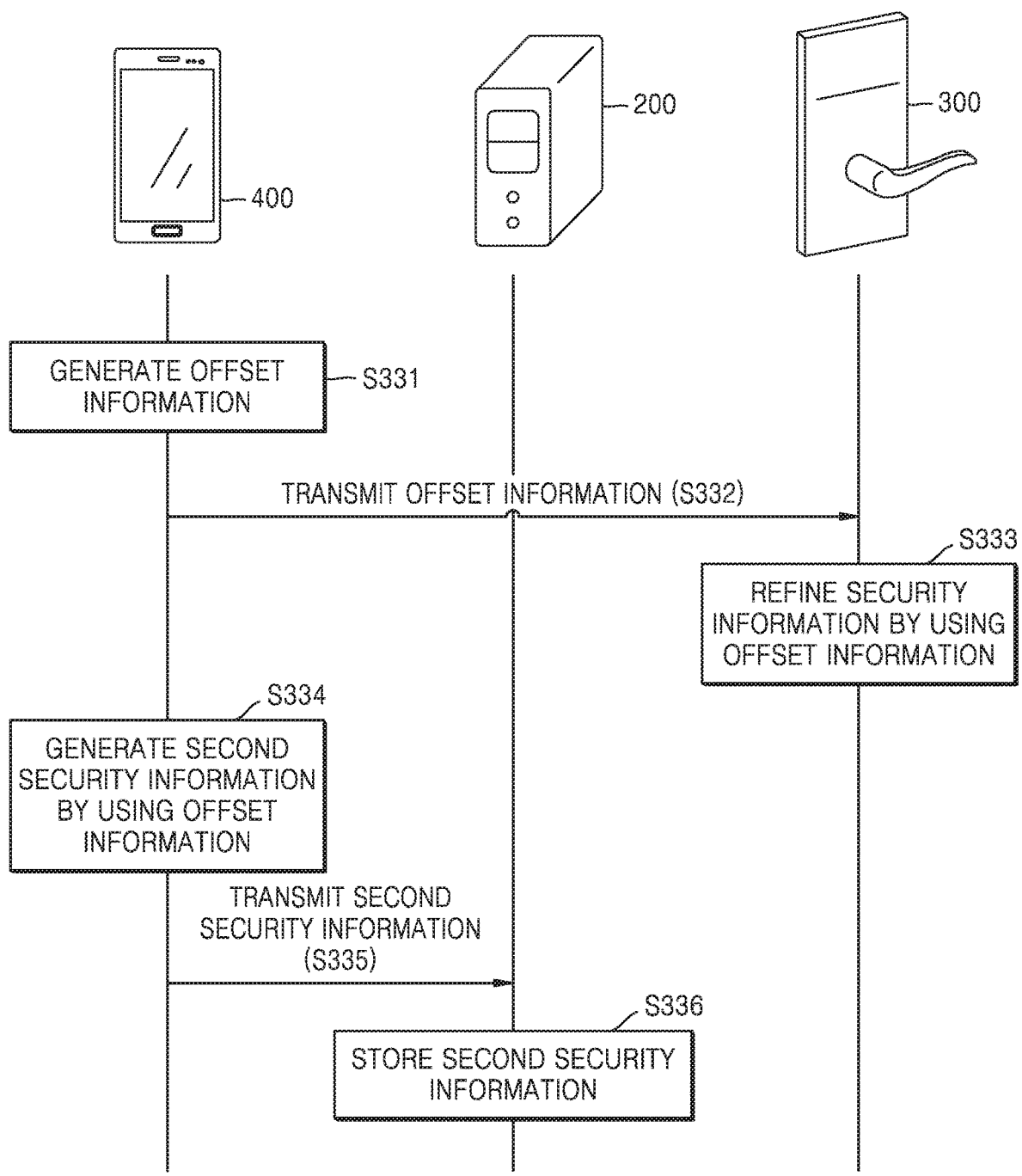
FIG. 10 is a data flow diagram showing processes of setting second security information in a door lock, according to another embodiment.

FIG. 10 is a data flow diagram showing processes of setting the second security information in the door lock 300, in operation S130, according to another embodiment.

Referring to FIG. 10, first, the first terminal 400 may generate offset information in operation S331. The offset information may be used to generate the second security information. The second security information may be security information used to unlock the door lock 300 the next time. The second security information may include a code.

The code may include at least one word. The word may include a bit string, a numeric, a character, a symbol, or a string. The offset information may include a word of the same type as the word included in the code. The first terminal 400 may generate the offset information by using a random algorithm. The first terminal 400 may store the generated offset information in the storage unit 140.

Then, the first terminal 400 may transmit the generated offset information to the door lock 300 via the short-distance communication, in operation S332. The communication unit 120 of the first terminal 400 may transmit the generated offset information to the door lock 300. For example, the communication unit 120 may transmit the offset information to the door lock 300 via MST. The door lock 300 may receive the offset information. The door lock 300 may store the received offset information in the door lock 300.

Then, the door lock 300 may refine the security information set in the door lock 300 by using the offset information, in operation S333. The door lock 300 may generate the second security information by using the offset information. The door lock 300 may generate the second security information by combining the security information set in the door lock 300 and the offset information. The door lock 300 may combine the security information and the offset information according to a pre-set combining algorithm. The combining algorithm may be pre-stored in the door lock 300. Also, an algorithm that is the same as the combining algorithm may be pre-stored in the storage unit 140 of the first terminal 400 or the server 200.

The combining algorithm may include, for example, addition, subtraction XORing, shifting, or a combination thereof, performed using the offset information and the security information set in the door lock 300. The door lock 300 may generate the second security information by using the combining algorithm. The door lock 300 may replace the security information set in the door lock 300 with the generated second security information. The door lock 300 may use the offset information again the next time. In other words, when the door lock 300 is to be unlocked again the next time, the door lock 300 may refine the security information set in the door lock 300 by using the offset information stored in the door lock 300 again without having to receive new offset information from the first terminal 400.

Figure 11:
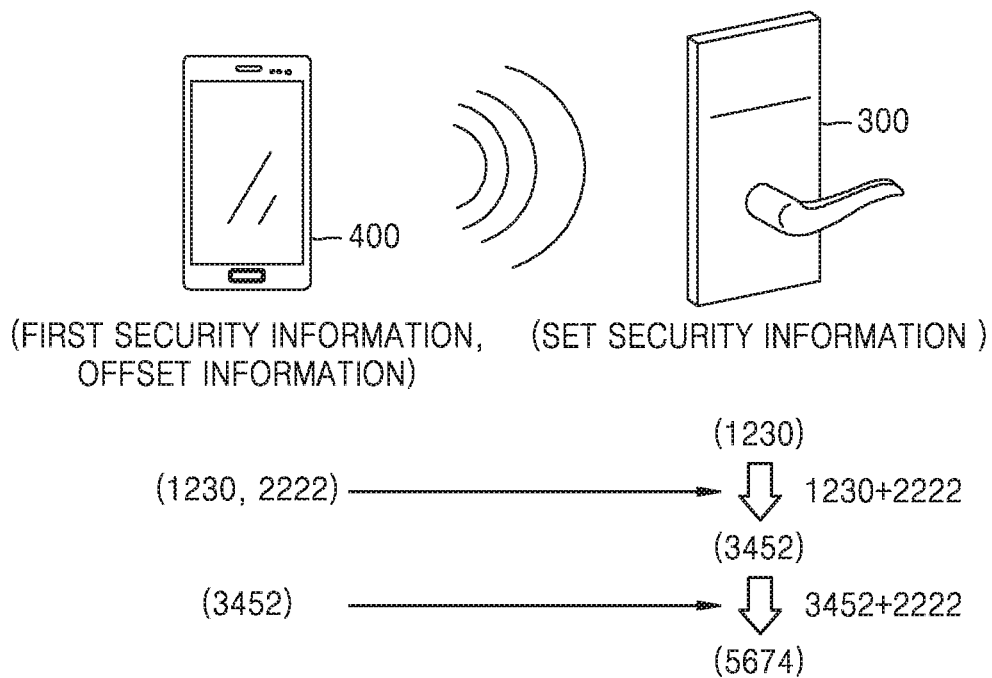
FIG. 11 is a reference diagram for describing the setting of the second security information in the door lock, according to the other embodiment.

FIG. 11 is a reference diagram for describing the setting of the second security information in the door lock 300, in operation S130, according to the other embodiment. Referring to FIG. 11, a code included in security information currently set in the door lock 300 may be '1230'. The first terminal 400 may transmit first security information including '1230' to the door lock 300 to unlock the door lock 300. Also, the first terminal 400 may generate offset information including '2222'. The first terminal 400 may transmit the generated offset information to the door lock 300. A combining algorithm pre-stored in the door lock 300 may be addition of the offset information and the security information currently set in the door lock 300. The door lock 300 may obtain '3452' by adding '1230' and '2222'. The door lock 300 may replace the security information set in the door lock 300 with security information including '3452'.

At the next time, the first terminal 400 may unlock the door lock 300 by transmitting first security information including '3452' to the door lock 300. Also, the door lock 300 may reuse the already received offset information without having to receive new offset information from the first terminal 400. The door lock 300 may obtain '5674' by adding '3452' and '2222'. The door lock 300 may replace the security information set in the door lock 300 with security information including '5674'.

Referring back to FIG. 10, the first terminal 400 may generate the second security information by using the offset information in operation S334. The first terminal 400 may generate the second security information by using a combining algorithm stored in the storage unit 140. The combining algorithm may be the same as a combining algorithm pre-stored in the door lock 300. The first terminal 400 may generate the second security information by combining the first security information and the offset information by using the combining algorithm.

Then, the first terminal 400 may transmit the second security information to the server 200 in operation S335. The communication unit 120 of the first terminal 400 may transmit the second security information to the server 200.

Then, the server 200 may store the second security information in operation S336. The server 200 may store the received second security information. The server 200 may replace the first security information included in the record detected by using the request message with the received second security information while loading the first security information in operation S111. Also, the server 200 may replace the information about the time included in the detected record with information about the current time.

Figure 12:
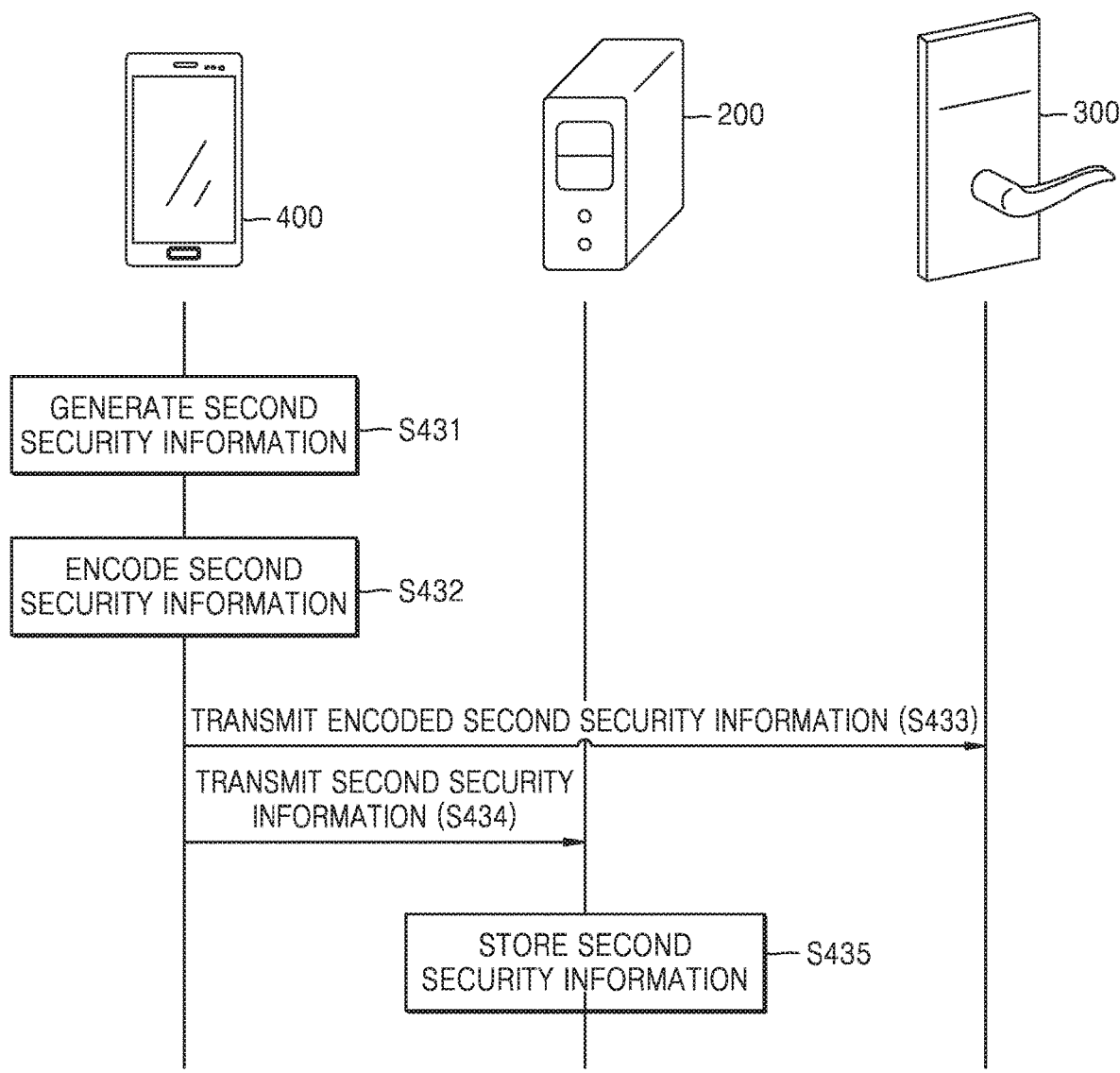
FIG. 12 is a data flow diagram showing processes of setting second security information in a door lock, according to another embodiment.

FIG. 12 is a data flow diagram showing processes of setting the second security information in the door lock 300 in operation S130, according to another embodiment.

Referring to FIG. 12, first, the first terminal 400 may generate the second security information in operation S431. The second security information may be security information used to unlock the door lock 300 the next time. The second security information may include a code. The first terminal 400 may generate the second security information by using a random algorithm. The first terminal 400 may store the generated second security information in the storage unit 140.

Next, the first terminal 400 may encode the second security information in operation S432. The controller 130 of the first terminal 400 may encode the second security information according to an encoding algorithm. The storage unit 140 of the first terminal 400 may pre-store the encoding algorithm. Also, the door lock 300 may pre-store an algorithm that is the same as the encoding algorithm in the door lock 300. The encoding algorithm may include, for example, conversion using a hash function, conversion using a hash table, or conversion using encryption.

In other words, the controller 130 may convert the second security information by using a hash function or a hash table. The hash function or the hash table may be pre-stored in the storage unit 140. The door lock 300 may pre-store a hash function or hash table that is the same as the hash function or hash table in the door lock 300.

As another example, the controller 130 may convert the second security information by using a particular encryption algorithm and a particular encryption key. The particular encryption algorithm and the particular encryption key may be pre-stored in the storage unit 140. The door lock 300 may pre-store an encryption algorithm and an encryption key that are the same as the particular encryption algorithm and the particular encryption key in the door lock 300.

Next, the first terminal 400 may refine the door lock 300 by transmitting the encoded second security information to the door lock 300 via the short-distance communication, in operation S433. The communication unit 120 of the first terminal 400 may transmit the converted second security information to the door lock 300 via the short-distance communication. The door lock 300 may replace the security information set in the door lock 300 with the encoded second security information.

Figure 13:
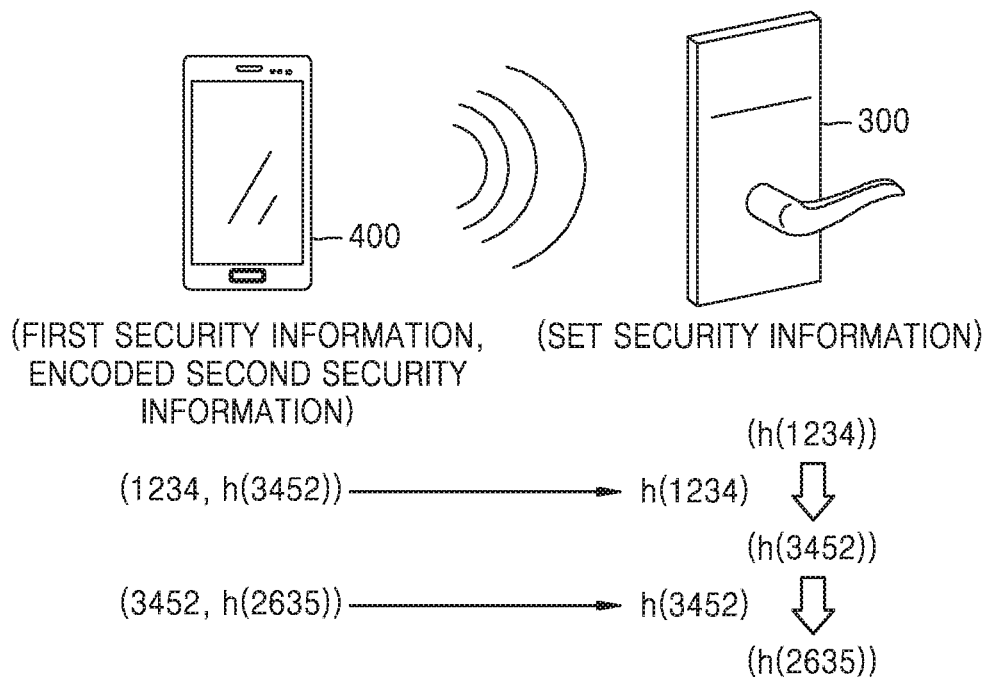
FIG. 13 is a reference diagram for describing the setting of the second security information in the door lock, according to the other embodiment.

FIG. 13 is a reference diagram for describing the setting of the second security information in the door lock 300, in operation S130, according to the other embodiment. Referring to FIG. 13, the security information currently set in the door lock 300 may include a result value of converting '1234' by using a hash function. The first terminal 400 may transmit first security information including '1234' to the door lock 300. The door lock 300 may convert a code '1234' included in the first security information by using the hash function. The door lock 300 may be unlocked by comparing the result value and a value included in the security information set in the door lock 300.

Also, the first terminal 400 may generate second security information including '3452'. The first terminal 400 may encode the second security information. The encoded second security information may include a result value of converting '3452' by using the hash function. The first terminal 400 may transmit the encoded second security information to the door lock 300. The door lock 300 may replace the security information set in the door lock 300 with the encoded second security information.

Next, the first terminal 400 may transmit first security information including '3452' to the door lock 300. The door lock 300 may convert the code '3452' included in the first security information by using the hash function. The door lock 300 may be unlocked by comparing a result value of the conversion and a value included in the security information set in the door lock 300.

Also, the first terminal 400 may generate second security information including '2635'. The first terminal 400 may encode the second security information. The encoded second security information may include a result value of converting '2635' by using the hash function. The first terminal 400 may transmit the encoded second security information to the door lock 300. The door lock 300 may replace the security information set in the door lock 300 with the encoded second security information.

Referring back to FIG. 12, the first terminal 400 may transmit the second security information to the server 200 in operation S434. The communication unit 120 of the first terminal 400 may transmit the second security information to the server 200.

Then, the server 200 may store the second security information in operation S435. The server 200 may store the received second security information. While loading the first security information in operation S111, the server 200 may replace the first security information included in the record detected by using the request message with the received second security information. Also, the server 200 may replace the information about the time included in the detected record with information about the current time.

Referring back to FIG. 4, the first terminal 400 may transmit an unlocking message to the server 200 in operation S140. The controller 130 of the first terminal 400 may transmit the unlocking message indicating that the door lock 300 is unlocked, to the server 200. The unlocking message may include information about the first terminal 400 or information about the user of the first terminal 400. For example, the unlocking message may include at least one of ID information of the first terminal 400, ID information of the user, personal information of the user, and preference information of the user.

The unlocking message may include information allowed to be externally transmitted, from among the personal information of the user stored in the storage unit 140 of the first terminal 400. For example, the unlocking message may include schedule information of the user.

The preference information of the user may include at least one of language information used by the user, TV channel information preferred by the user, indoor temperature information preferred by the user, and illumination information preferred by the user. The preference information of the user is not limited thereto, and may include value types of information.

Figure 14:
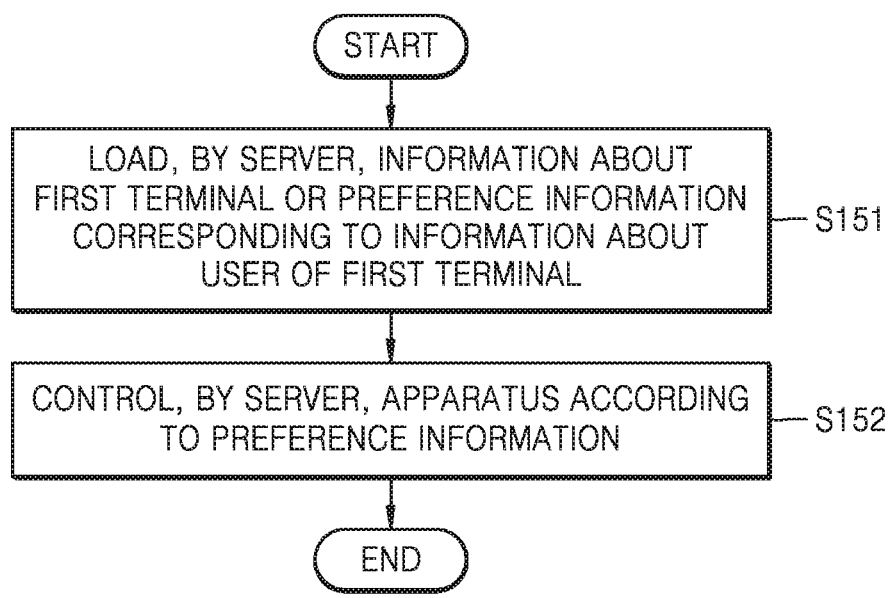
FIG. 14 is a flowchart of processes of controlling at least one apparatus provided inside a room, according to an embodiment.

Then, the server 200 may control at least one apparatus provided inside the room by using the unlocking message, in operation S150. FIG. 14 is a flowchart of processes of controlling the at least one apparatus provided inside the room in operation S150, according to an embodiment.

Referring to FIG. 14, first, the server 200 may load the preference information corresponding to the information about the first terminal 400 or to the information about the user of the first terminal 400, in operation S151. The server 200 may search a DB by using the information about the first terminal 400 or the information about the user of the first terminal 400, which is included in the unlocking message. The server 200 may detect a corresponding record as a result of the searching. The server 200 may load personal information or preference information of the user, which is included in the detected record. Alternatively, the server 200 may load the personal information or preference information of the user included in the unlocking message.

Next, the server 200 may control the at least one apparatus according to the preference information, in operation S152. For example, at least one of a TV, an air conditioner, a lamp, and a window control apparatus may be provided inside the room. Various types of apparatuses may be unlimitedly provided inside the room. The server 200 may control at least one of the apparatuses provided inside the room according to the loaded preference information.

For example, when the loaded preference information includes language information used by the user, the server 200 may set a display language of the TV to a language used by the user. As another example, when the loaded preference information includes TV channel information preferred by the user, the server 200 may set a channel displayed on the TV to a TV channel preferred by the user. As another example, when the loaded preference information includes indoor temperature information preferred by the user, the server 200 may control the air conditioner such that an indoor temperature of the room is adjusted to an indoor temperature preferred by the user. As another example, when the loaded preference information includes illumination information preferred by the user, the server 200 may control the lamp such that illumination of the room is adjusted to illumination preferred by the user.

According to another embodiment, the server 200 may determine that the user is a cleaner, based on the information about the first terminal 400 or about the user of the first terminal 400 included in the unlocking message. The server 200 may control at least one of the apparatuses provided inside the room such that the user easily cleans the room. For example, the server 200 may control the window control apparatus to open a window. Also, the server 200 may control the lamp such that the illumination of the room is highest.

As such, according to embodiments, since the apparatuses provided inside the room are automatically controlled according to the preference information, improved convenience may be provided to the user.

Figure 15:
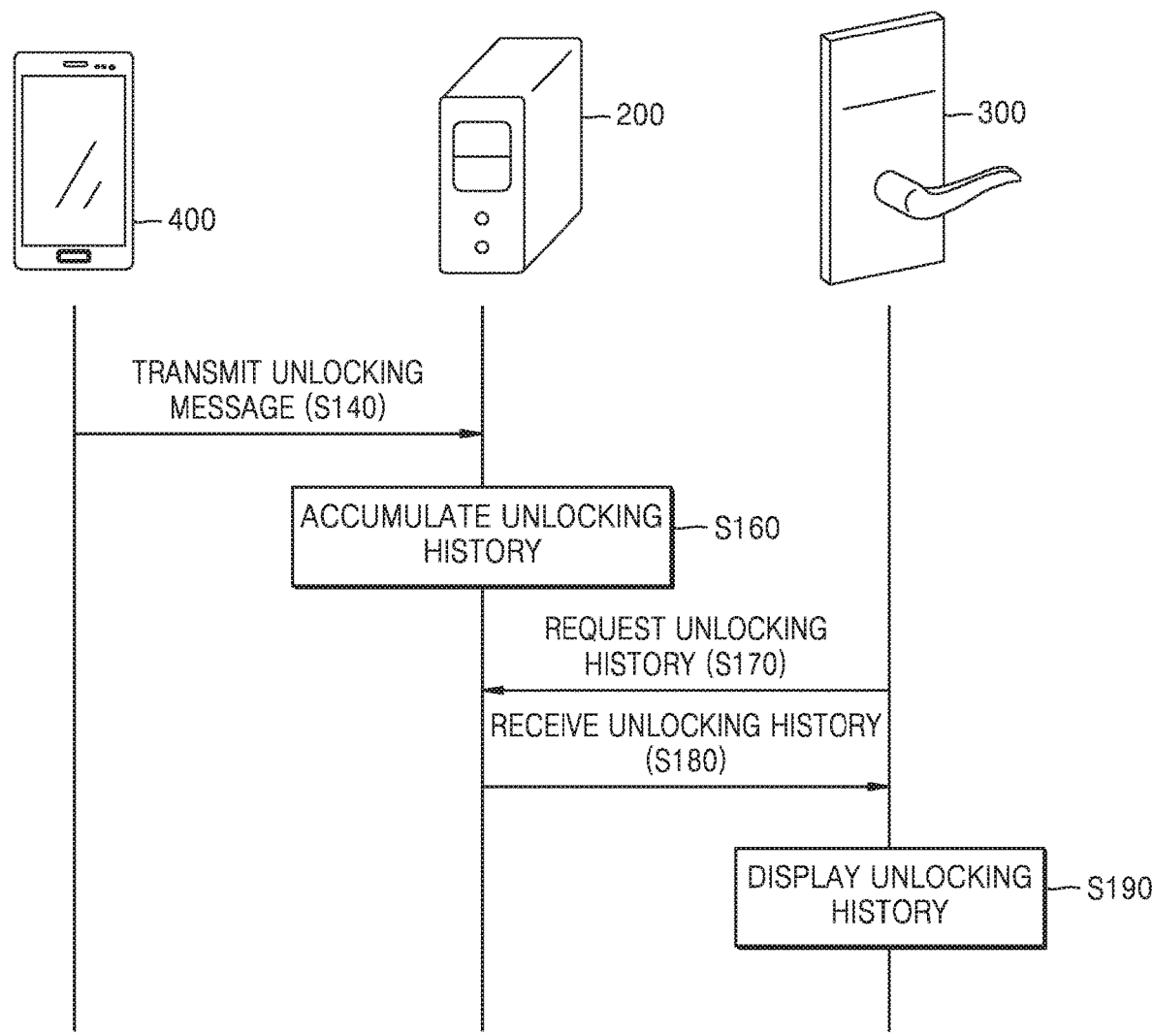
FIG. 15 is a data flow diagram showing processes of displaying an unlocking history of unlocking a door lock after the door lock is unlocked, according to an embodiment.

FIG. 15 is a data flow diagram showing processes of displaying an unlocking history of unlocking the door lock after 300 the door lock 300 is unlocked, according to an embodiment.

Referring to FIG. 15, first, the first terminal 400 may transmit the unlocking message to the server 200 in operation S140. The controller 130 of the first terminal 400 may transmit the unlocking message indicating that the door lock 300 is unlocked, to the server 200. The unlocking message may include information about the first terminal 400 or information about the user of the first terminal 400. For example, the unlocking message may include at least one of ID information of the first terminal 400, ID information of the user, personal information of the user, and preference information of the user.

Then, the server 200 may accumulate an unlocking history of unlocking the door lock 300 by using the unlocking message, in operation S160. The server 200 may generate a record by using the unlocking message. The record may include current time information and the ID information of the user. The server 200 may store the generated record in a DB.

Then, the second terminal 500 may request the server 200 for the unlocking history in operation S170. The second terminal 500 may be the door lock control apparatus 100. The user of the first terminal 400 and a user of the second terminal 500 may be different from each other. The second terminal 500 may request the server 200 for the unlocking history of unlocking the door lock 300 through the communication unit 120 of the second terminal 500. The second terminal 500 may request the server 200 for the unlocking history by transmitting a request message to the server 200. The server 200 may receive the request message from the second terminal 500.

Then, the second terminal 500 may receive the unlocking history from the server 200, in operation S180. The server 200 may load an unlocking history record accumulated in a DB, in response to the request message. The server 200 may transmit the loaded unlocking history record to the second terminal 500. The second terminal 500 may receive the unlocking history record from the server 200.

Then, the second terminal 500 may display the unlocking history in operation S190. The output unit 150 of the second terminal 500 may display the received unlocking history record. Accordingly, the user of the second terminal 500 may view the unlocking history of unlocking the door lock 300. Thus, according to embodiments, the door lock control method having enhanced security may be provided.

Figure 16:
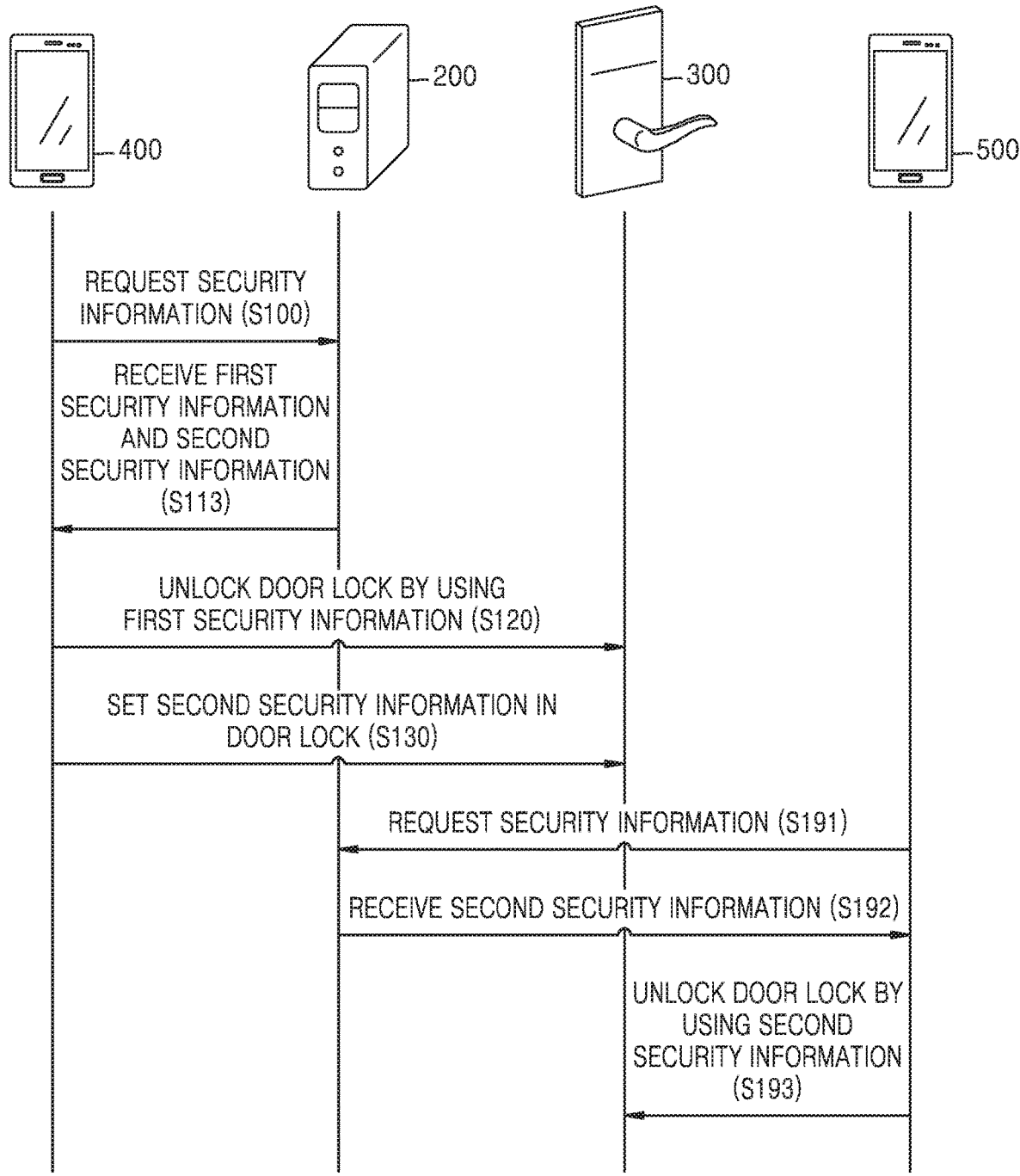
FIG. 16 is a data flow diagram showing processes of unlocking, by a second terminal, a door lock after the door lock is unlocked by a first terminal, according to an embodiment.

FIG. 16 is a data flow diagram showing processes of unlocking, by the second terminal 500, the door lock 300 after the door lock 300 is unlocked by the first terminal 400, according to an embodiment.

Referring to FIG. 16, first, the first terminal 400 may request the server 200 for security information corresponding to the door lock 300, in operation S100. Then, the first terminal 400 may receive the first and second security information from the server 200 in operation S113. Then, the first terminal 400 may unlock the door lock 300 by using the first security information, in operation S120. Then, the first terminal 400 may set the second security information in the door lock 300, in operation S130.

Then, the second terminal 500 may request the server 200 for the security information corresponding to the door lock 300, in operation S191. The user of the first terminal 400 and the user of the second terminal 500 may be different from each other. The second terminal 500 may request the server 200 for the security information for unlocking the door lock 300 through the communication unit 120 of the second terminal 500.

The second terminal 500 may request the server 200 for the security information by transmitting a request message to the server 200. The request message may include ID information of the room, ID information of the second terminal 500, and ID information of the user of the second terminal 500. The server 200 may receive the request message from the second terminal 500.

Then, the second terminal 500 may receive the second security information from the server 200, in operation S192. The second security information may be security information generated by and stored in the server 200.

Then, the second terminal 500 may unlock the door lock 300 by using the second security information in operation S193. Since security information currently set in the door lock 300 is the same as the second security information, the second terminal 500 may unlock the door lock 300 by using the second security information. Accordingly, even when a plurality of users try to unlock the door lock 300, each of the users may unlock the door lock 300 by using their own terminals, i.e., the first and second terminals 400 and 500.

Figure 17:
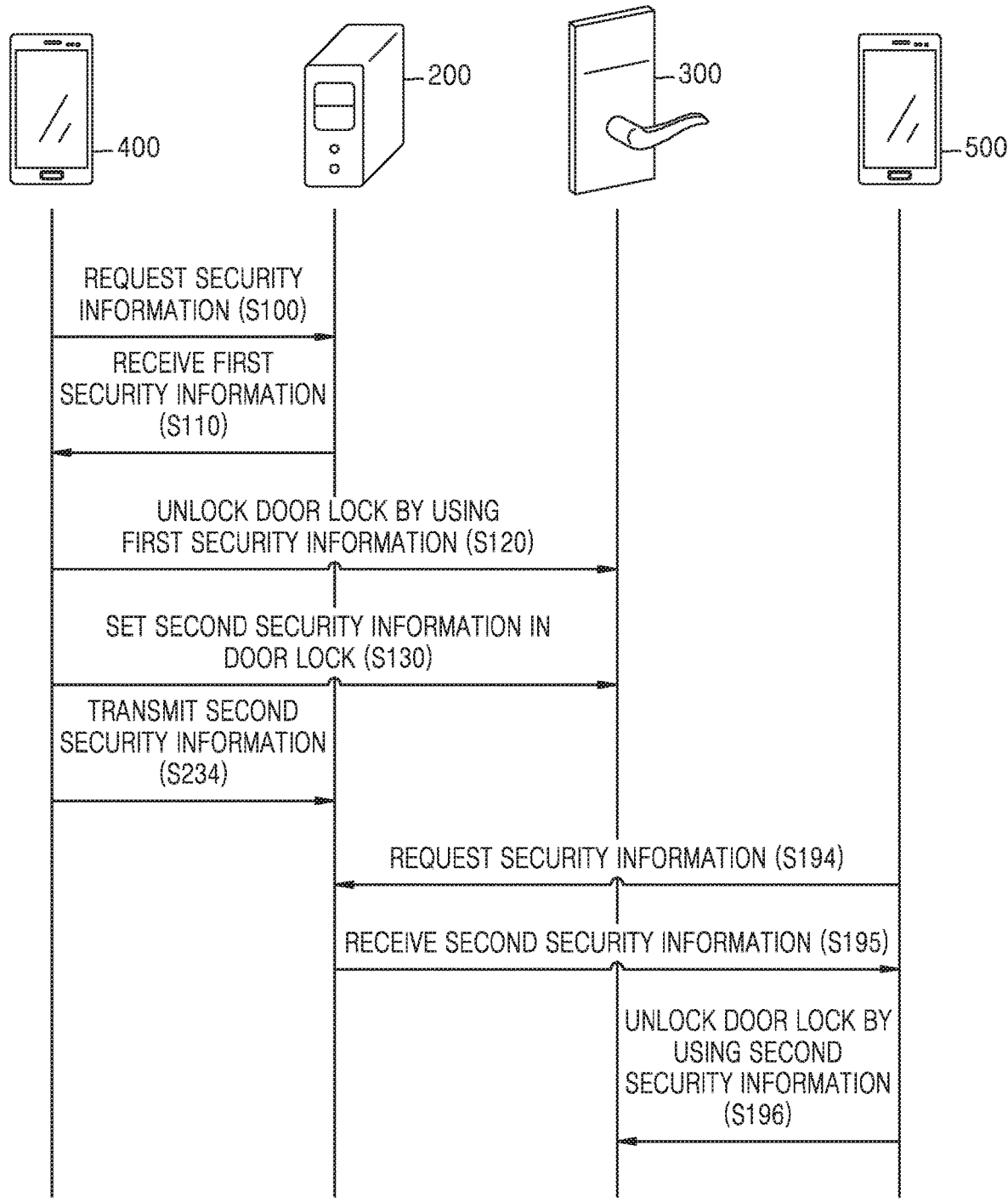
FIG. 17 is a data flow diagram showing processes of unlocking, by a second terminal, a door lock after the door lock is unlocked by a first terminal, according to another embodiment.

FIG. 17 is a data flow diagram showing processes of unlocking, by the second terminal 500, the door lock 300 after the door lock 300 is unlocked by the first terminal 400, according to another embodiment.

Referring to FIG. 17, first, the first terminal 400 may request the server 200 for security information corresponding to the door lock 300, in operation S100. Then, the first terminal 400 may receive the first security information from the server 200 in operation S110. Then, the first terminal 400 may unlock the door lock 300 by using the first security information in operation S120. Then, the first terminal 400 may set the second security information in the door lock 300 in operation S130. Then, the first terminal 400 may transmit the second security information in the server 200 in operation S234.

Then, the second terminal 500 may request the server 200 for the security information corresponding to the door lock 300, in operation S194. The user of the first terminal 400 and the user of the second terminal 500 may be different from each other. The second terminal 500 may request the server 200 for the security information for unlocking the door lock 300 through the communication unit 120 of the second terminal 500.

The second terminal 500 may request the server 200 for the security information by transmitting a request message to the server 200. The request message may include at least one of ID information of the room, ID information of the second terminal 500, and ID information of the user of the second terminal 500. The server 200 may receive the request message from the second terminal 500.

Then, the second terminal 500 may receive the second security information from the server 200 in operation S195. The second security information may be security information generated by the first terminal 400 and stored in the server 200.

Then, the second terminal 500 may unlock the door lock 300 by using the second security information in operation S196. Since security information currently set in the door lock is the same as the second security information, the second terminal 500 may unlock the door lock 300 by using the second security information. Accordingly, even when a plurality of users try to unlock the door lock 300, each of the users may unlock the door lock 300 by using their own terminals, i.e., the first and second terminals 400 and 500.

According to one or more embodiments, security of the door lock 300 may be enhanced. Also, improved convenience may be provided to the user of the door lock 300.

Embodiment described above may also be realized in a form of a computer-readable recording medium, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

The invention claimed is:

1. A door lock control method using a terminal, the method comprising:
    requesting, from a server, security information currently set in a door lock in a locked position;
    receiving, from the server, first security information corresponding to the security information currently set in the door lock;
    transmitting the first security information to the door lock;
    unlocking the door lock by using the first security information;
    transmitting second security information to the door lock; and
    setting the security information in the door lock based on the second security information,
    wherein the second security information is different from the first security information.

2. The door lock control method of claim 1, wherein the unlocking of the door lock comprises:
    unlocking the door lock by the transmission of the first security information to the door lock via short-distance communication; and
    detecting a signal generated based on the door lock being unlocked.

3. The door lock control method of claim 2, wherein the short-distance communication comprises at least one of magnetic secure transmission (MST), radio frequency identification (RFID), near field communication (NFC), ZigBee, Z-Wave, Bluetooth, Bluetooth low energy (BLE), Wi-Fi, or infrared (IR) communication.

4. The door lock control method of claim 1, wherein the second security information is generated by the server.

5. The door lock control method of claim 1, wherein the setting of the second security information comprises refining the door lock by the transmission of the second security information to the door lock via short-distance communication.

6. The door lock control method of claim 1, wherein the setting of the second security information comprises:
    generating the second security information;
    refining the door lock by the transmission of the second security information to the door lock via short-distance communication; and
    transmitting the second security information to the server for storage of the second security information.

7. The door lock control method of claim 1, wherein the setting of the second security information comprises:
    generating offset information;
    refining the door lock by transmitting the offset information to the door lock via short-distance communication;
    generating the second security information by using the offset information; and
    transmitting the second security information to the server for storage of the second security information.

8. The door lock control method of claim 1, wherein the setting of the second security information comprises:
    generating the second security information;
    encoding the second security information;
    refining the door lock by transmitting the encoded second security information to the door lock via short-distance communication; and
    transmitting the second security information to the server for storage of the second security information.

9. The door lock control method of claim 1, further comprising:
    transmitting a message indicating unlocking of the door lock to the server.

10. The door lock control method of claim 9, wherein the message comprises information about the terminal or information about a user of the terminal.

11. The door lock control method of claim 9, further comprising:
    requesting the server for an unlocking history of unlocking the door lock;
    receiving the unlocking history from the server; and
    displaying the unlocking history.

12. The door lock control method of claim 11,
    wherein the unlocking history comprises at least one record, and wherein each of the at least one record comprises at least one of information about a time when the door lock was unlocked, information about the terminal used to unlock the door lock, or information about a user of the terminal used to unlock the door lock.

13. A door lock control apparatus comprising:
a communication unit configured to communicate with a server and a door lock; and
a controller configured to:
control the communication unit to request, from the server, security information currently set in the door lock in a locked position,
control the communication unit to receive, from the server, first security information corresponding to the security information currently set in the door lock,
control the communication unit to transmit the first security information to the door lock to unlock the door lock by using the first security information,
control the communication unit to transmit second security information to the door lock, and
set the security information in the door lock based on the second security information,
wherein the second security information is different from the first security information.

14. A non-transitory computer-readable recording medium having recorded thereon a program which, when executed on a computer, performs the door lock control method of claim 1.

15. The door lock control apparatus of claim 13, wherein the controller is further configured to:
unlock the door lock by transmitting the first security information to the door lock via short-distance communication; and
detect a signal generated based on the door lock being unlocked.

16. The door lock control apparatus of claim 13, wherein the communication unit is further configured to receive, from the server, the first security information and the second security information that is generated by the server.

17. The door lock control apparatus of claim 13, wherein the controller is further configured to refine the door lock by transmitting the second security information to the door lock via short-distance communication.

18. The door lock control apparatus of claim 13, wherein the controller is further configured to:
generate the second security information,
refine the door lock by transmitting the second security information to the door lock via short-distance communication, and
transmit the second security information to the server for storage of the second security information.

19. The door lock control apparatus of claim 13, wherein the controller is further configured to:
generate offset information,
refine the door lock by transmitting the offset information to the door lock via short-distance communication,
generate the second security information by using the offset information, and
transmit the second security information to the server for storage of the second security information.

20. The door lock control apparatus of claim 13, wherein the controller is further configured to:
generate the second security information,
encode the second security information,
refine the door lock by transmitting the encoded second security information to the door lock via short-distance communication, and
transmit the second security information to the server for storage of the second security information.

* * * * *